United States Patent [19]

Henderson

[11] 4,396,832
[45] Aug. 2, 1983

[54] PATTERN TRACER USING DIGITAL LOGIC

[75] Inventor: John L. Henderson, Burlington, Canada

[73] Assignee: Westinghouse Canada Inc., Hamilton, Canada

[21] Appl. No.: 307,796

[22] Filed: Oct. 2, 1981

[30] Foreign Application Priority Data

Mar. 31, 1981 [CA] Canada ................................ 374283

[51] Int. Cl.³ .............................................. G05B 1/00
[52] U.S. Cl. .................................... 250/202; 318/577
[58] Field of Search .................. 250/202, 206, 214 R; 318/577

[56] References Cited

U.S. PATENT DOCUMENTS 3,883,735 5/1975 Murphy et al. ...................... 250/202

Primary Examiner—David C. Nelms
Assistant Examiner—Darwin R. Hostetter
Attorney, Agent, or Firm—R. H Fox; E. H. Oldham

[57] ABSTRACT

An optical pattern tracer is disclosed, of the circular scanning type. The interception of the pattern by the scan produces electrical outputs which are reduced to numerical values representative of their time of occurrence with reference to the scanning circle. The numbers derived and the nature of the signal generated are then processed to indicate the direction of the pattern, presence or absence of command marks and combined with other reference inputs, such as kerf and direction of tracing used to control a drive mechanism to move the tracer around the pattern.

7 Claims, 12 Drawing Figures

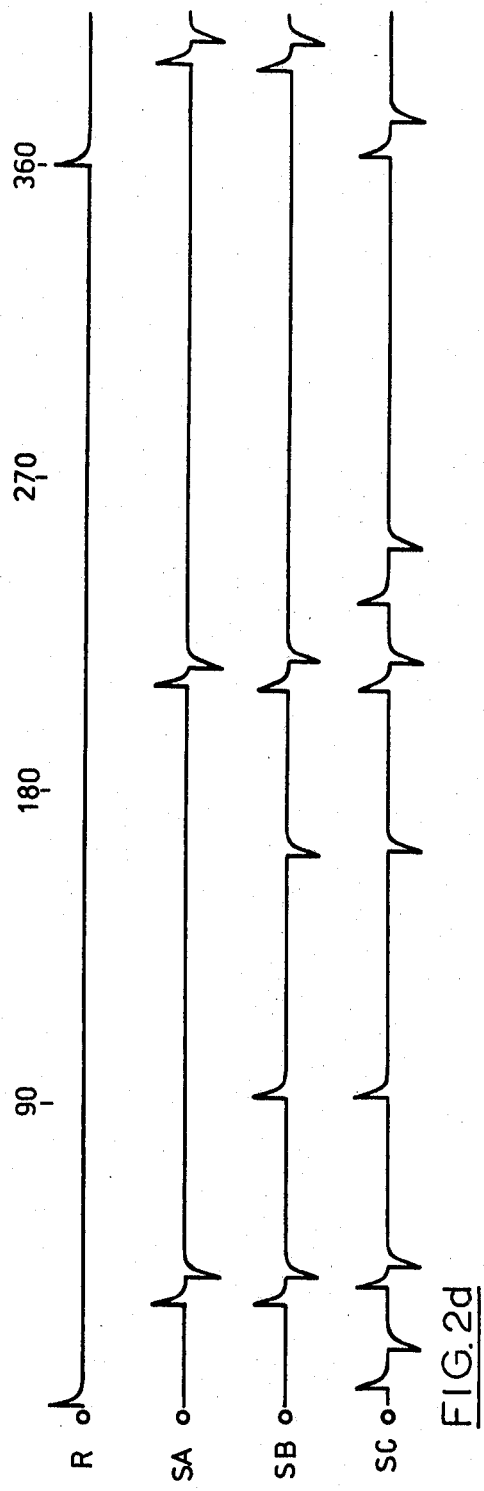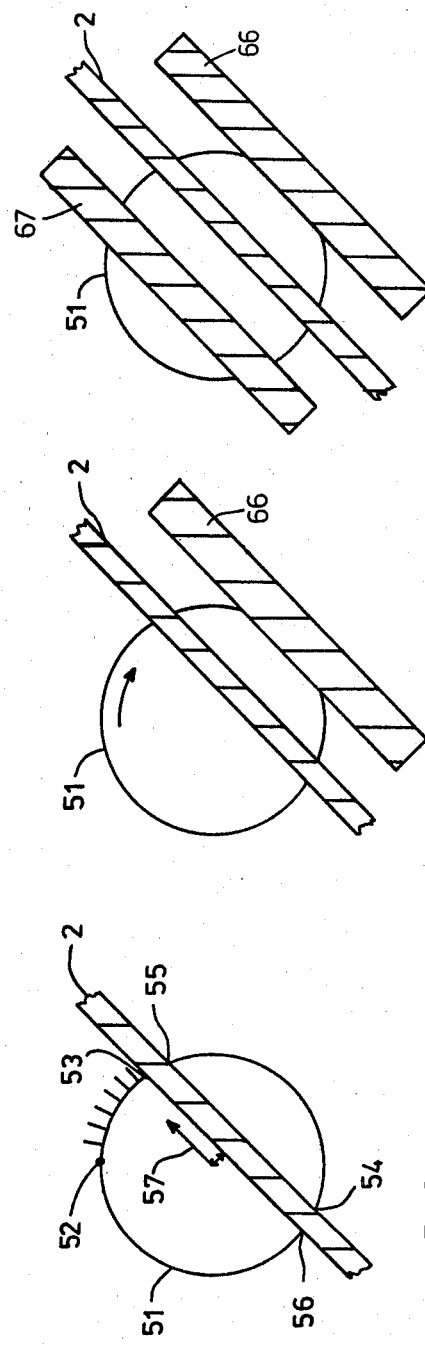
FIG. 2a
FIG. 2b
FIG. 2c
FIG. 2d

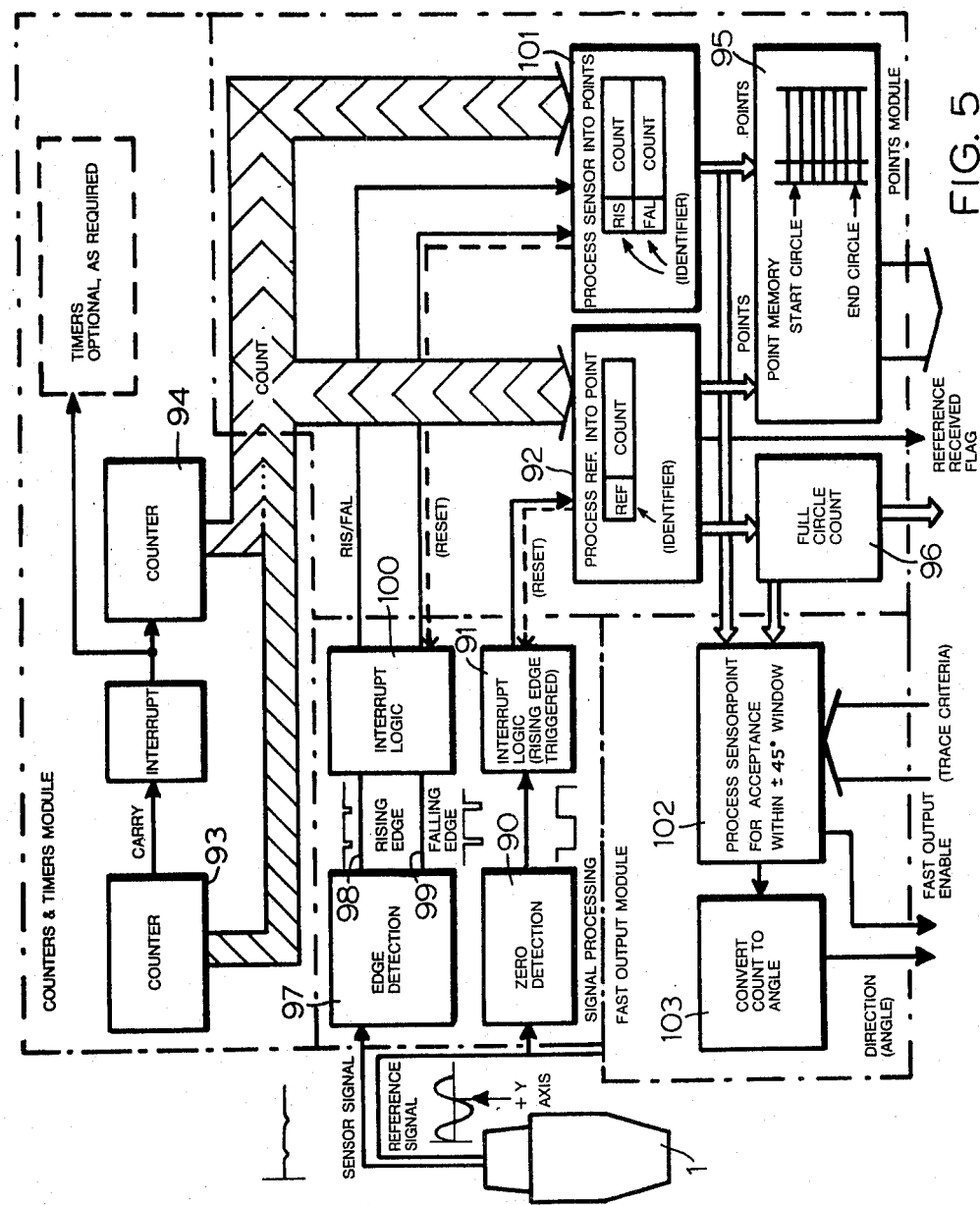

PATTERN TRACER USING DIGITAL LOGIC

BACKGROUND OF THE INVENTION

Optical pattern tracers are well known in the machine tool field and are commonly used to control the cutting of various machine tools, particularly, gas and flame cutting machines which may be caused to cut specific shapes from material based upon a predetermined pattern. One class of such pattern tracers are optical pattern tracers which view a pattern, such as a dark silhouette or line on a white surface, and cause the tracer and its associated machine tool to follow the convolutions of the pattern. One of the preferred forms of optical tracers scans a circular area repetitively crossing the edge of the pattern and producing an electrical signal representative of the change of reflectance as the scanning action crosses the edge of the pattern. This electrical signal is then used, together with a reference signal and other information, to produce coordinate drive information to control X and Y drive motors which cause the machine to move with constant tangential velocity around the pattern.

With increasing sophistication of such equipment, the additional information which must be derived can produce quite complex electronic circuitry to enable the machine to identify not only the pattern itself but auxiliary marks associated with the pattern, sometimes called command marks, discontinuities in the pattern, and other conditions which give rise to special problems.

PRIOR ART

Typical of the tracers of this class are those described in:

U.S. Pat. No. 3,704,372 issued Nov. 28, 1972 to Robert E. Parker, et al.;

U.S. Pat. No. 3,727,120 issued Apr. 10, 1973 to George S. Jewell, et al.;

U.S. Pat. No. 3,860,862 issued Jan. 14, 1975 to William Dell, et al.;

U.S. Pat. No. 3,883,735 issued May 13, 1975 to Francis P. Murphy, et al.

SUMMARY OF THE INVENTION

In accordance with the present invention, a pattern is scanned by an optical scanning device which produces, first a reference signal to provide a consistent direction indication for the scanning circle, second, a signal representative of a light to dark transition when the scanning mechanism encounters a pattern and third, an electrical signal representing a dark to light transition when the scanning mechanism leaves the pattern. These three kinds of signals are then converted to digital count values representative of their relative positions in the scanning circle. A logical analysis of the signals produced during a single scan, that is, a single complete circular traverse of the scanning device, will, when combined with other information, such as the desired kerf, and whether a clockwise or counterclockwise trace of the pattern is to be accomplished, permit the production of control signals to control the analog values of X and Y coordinate drives. The logical analysis and processing of the information, both from the tracing head and from the other controls of the apparatus, permit the tracer to properly select the pattern, to respond to command marks, to provide the proper kerf, to disregard flaws in the pattern, to accept discontinuities and provide other very desirable functions.

BRIEF DESCRIPTION OF THE DRAWINGS

A clearer understanding of my invention may be had from the following description and drawings, in which:

FIG. 2 is an illustration of the scanning of a pattern and the resulting signals;

FIG. 5 is a functional flow diagram of the tracing signal processing;

Figure 1:
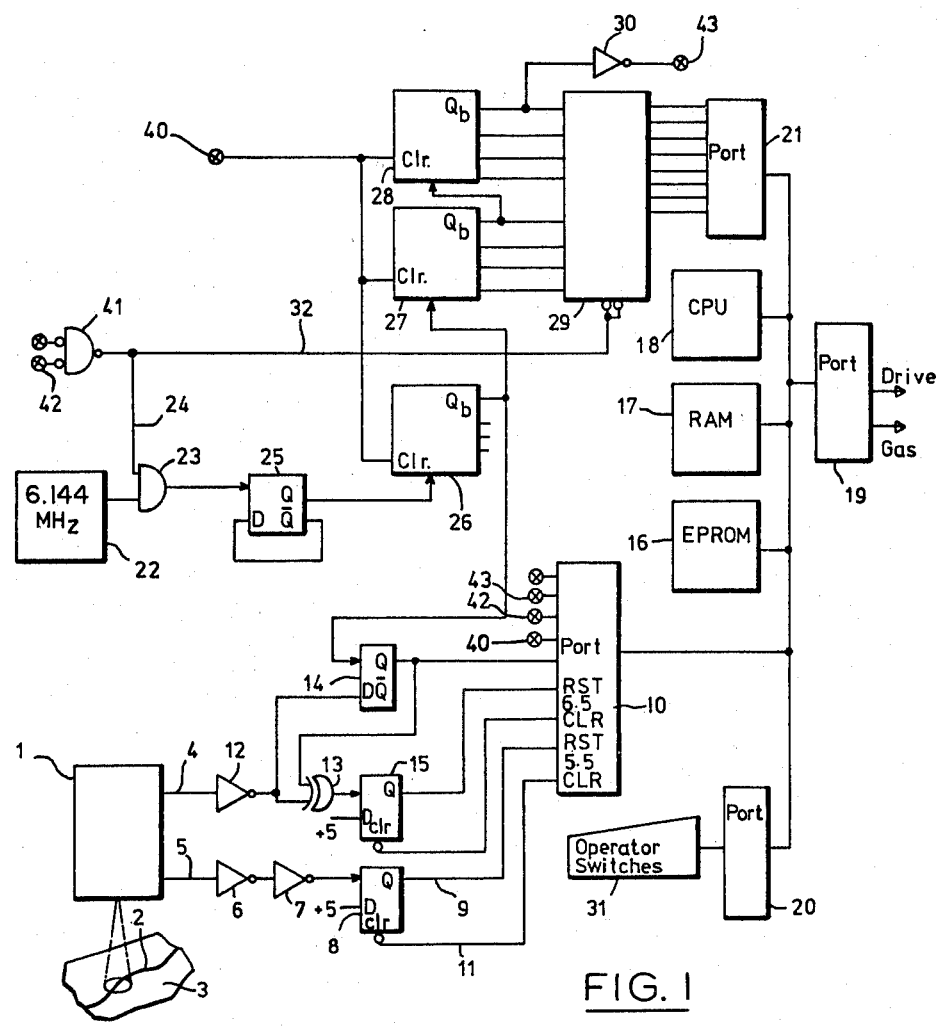
FIG. 1 is a system block diagram illustrating the physical components used in the novel portion of the system.

Considering first FIG. 1, it will be seen that this is a block diagram and single line drawing in which a single line may actually represent a large number of conductors and a block may represent a complex function, in a manner well known to those skilled in the digital processing art.

It will be seen that a circular scanning optical tracing head 1 of the type described in the preceding patents, scans a line 2 on a surface 3 causing a signal on conductor 4 each time the scan encounters the pattern. For each complete revolution the scanning head also produces a reference signal on conductor 5. The reference signal on conductor 5 is amplified through amplifiers 6 and 7 and applied to a latch 8 clocking a one on the Q terminal on conductor 9 which is applied to port 10. A clear signal is received from port 10 and applied over conductor 11 to latch 8. The signals on conductor 4 indicating the scan has intercepted a pattern are amplified by amplifier 12 and applied to exclusive OR 13 and also to latch 14. The Q output from the latch 14 is also applied to exclusive OR 13 and also to port 10. The output from the exclusive OR 13 is applied to latch 15 which in turn supplies an output from its Q terminal to port 10. A clear signal from port 10 is also applied to the clear terminal of latch 15.

Port 10 is an input/output port for a microprocessor including erasable programmable memory 16, a random access memory 17, central processor unit 18 and three other input/output ports 19, 20 and 21.

A clock 22 provides pulses at a frequency of 6.144 megahertz to AND 23. In the presence of a one on conductor 24, the clock pulses are applied to flip-flop 25 which functions as a divide by two circuit and the output from flip-flop 25 is applied to counter 26 which provides an output at its terminal $Q_D$ of one pulse for every 16 pulses applied or one pulse for every 32 clock pulses. This output is applied to counter 27 which together with counter 28 provides a readout of binary numbers from 0 to 256. When that number is reached, an output is applied through amplifier inverter 30 to terminal 48 and thence to port 10 and provides a carry signal.

The output from counters 27 and 28 is applied through gate 29 to port 21. This output is only applied when a signal is provided from conductor 32 which in turn is controlled by NAND 41. The input to NAND 41 is provided from the input/output port 10 from terminal 42 for example.

The various signals applied to ports 21 and 10 are applied to the microprocessor.

The operator switches which determine for example the mode of operation, whether the tracing should be clockwise or counterclockwise, whether the machine is under the control of the pattern, the amount of kerf etc. all feed in from the operator switches 31 through port 20 which also provides signals to the microprocessor. The signals received from the various ports are processed by the microprocessor and produce outputs from the input/output port 10 and from the output port 19. The output from port 19 is then used to control the coordinate drive of the machine by converting the digital information to analog control signals and also to control other functions such as for example, the gas flow to permit preheat or cutting.

Considering now FIG. 2 which is a detailed illustration of the scanning of a pattern, it will be seen that the scanning circle 51 intercepts a pattern consisting of a line 2. Assuming for the sake of explanation that the scanning commences at a reference point 52 and proceeds in the clockwise direction, it intercepts line 2 at 53 where the sensor indicates the transition from light to dark condition. This signal, which may be assumed to be a positive going pulse, appears on conductor 4. As the scan leaves the line at 55, it produces a second pulse which may be assumed to be negative going. Similarly, pulses are produced at points 54 and 56 which pulses appear on conductor 4 and when the scan completes its complete cycle it crosses point 52 and a reference signal is produced on conductor 5.

Considering now FIG. 2d, this is a graphical time-related representation of the signals at various points in the system. The reference pulses are shown at R in FIG. 2d. The pulses on conductor 4 are shown at SA. It will be seen that a positive going pulse occurs at point 53 followed by a negative going pulse at point 55 on FIG. 2a. Similarly, a positive going pulse is produced at point 54 followed by a negative going pulse at point 56. FIG. 2b illustrates not only the line 2, but also a command mark 66 and graph SB in FIG. 2d illustrates the wave shapes produced by the presence of both the line and the command mark. FIG. 2c illustrates two command marks 66 and 67 and graph SC in FIG. 2d illustrates the pulse produced when scanning a pattern of the nature illustrated in FIG. 2c.

SYSTEM OPERATION

The reference pulse occurring at point 52 on FIG. 2a produces an output on conductor 5 which passes through amplifiers 6 and 7 and clocks latch 8 causing a one on the Q terminal which remains high causing conductor 9 to be high which high or one signal is applied through port 10 through the microprocessor. The microprocessor is arranged to cause certain functions to occur when a one is received through the port on this conductor. On completion of these functions, a signal is applied from the microprocessor to port 10 to conductor 11 resetting latch 8. Amongst actions performed in response to a one on conductor 9 is a clear signal on terminal 40 of port 10 which terminal 40 corresponds to the terminal 40 connected to counters 26, 27 and 28, clearing all these counters and resetting the count to zero.

When a one is applied from conductor 24, the output from clock 22 is applied through AND 23 to the divide by two circuit 25 and thence to counter 26. After counter 26 counts through 16, an output occurs on $Q_D$ terminal which is applied to counter 27 and also to latch 14. If the scanner is then over a white portion of the pattern, a one is applied to the D terminal of latch 14. The one from counter 26 applied to latch 14 clock the one from the D terminal onto the output of latch 14 which output is applied to port 10. When this one is applied to the exclusive OR circuit 13, no output is produced since the other input is a one. This condition repeats until such time as the scanner encounters a line whereupon the high applied to latch 14 is replaced by a low. When this low is applied to the exclusive OR 13, the output from the Q terminal of latch 14 is still high. An output is then produced from the exclusive OR 13 which is applied to latch 15 causing a one to be latched to port 10 from the Q terminal of latch 15. This one is applied to the microprocessor and causes certain functions to occur. Amongst them, a signal is applied from port 10 through terminal 42 to terminal 42 of NAND 41 causing the gate 29 to apply the count then existing on counters 27 and 28 to port 21 and at the same time momentarily disabling the clock pulses by applying a zero to conductor 24.

The count transferred from the gate 29 to port 21 is stored in the microprocessor memory in a list in a location indicating its sequence with reference to the reference point 52, that is, the first number stored is stored as the first number in the list. This sequence repeats causing numbers to be stored in the memory representative of the position of the pulses produced and occurring on conductor 4. At the same time, the nature of the pulse is indicated by the Q output from the latch 14 which is also applied to the port 10 and indicates the pulse polarity. The information regarding the pulse polarity is stored in the memory with the number related to that particular pulse.

When reference point 52 is again encountered by the scanner, a signal on conductor 9 causes the number applied to gate 29 to also be stored in the microprocessor memory and identified as a reference number rather than sense numbers which were previously recorded. The occurrence of the signal on conductor 9 is sufficient identification to indicate that the count being stored is a reference point. At the same time, a signal is produced on terminal 40 clearing the counters resetting them to zero and the cycle is repeated.

The microprocessor will therefore contain a list of numbers representing light to dark transitions encountered during the scan and a number representative of a complete scan. Other light/dark transitions may occur during the scan as indicated in FIGS. 2b and 2c for example. In FIG. 2b the command mark 56 results in the signals as shown at FIG. 2d at SB. Graphs SA, SB and SC in FIG. 2d show only the sense signal since the reference signals are all shown on graph R and do not change from example to example. The following table shows the sort of numbers which would be stored in the memory of the microprocessor:

| Column 1 | | Column 2 | | Column 3 | |
|---|---|---|---|---|---|
| Count | | Count | | Count | |
| R | 0 | R | 0 | R | 0 |
| + | 373 | + | 373 | + | 45 |
| − | 463 | − | 463 | − | 200 |

-continued

| Column 1 | | Column 2 | | Column 3 | |
|---|---|---|---|---|---|
| | Count | | Count | | Count |
| + | 1780 | + | 790 | + | 373 |
| − | 1870 | − | 1420 | − | 463 |
| R | 3200 | + | 1780 | + | 790 |
| | | − | 1870 | − | 1420 |
| | | R | 3200 | + | 1780 |
| | | | | − | 1870 |
| | | | | + | 1995 |
| | | | | − | 2150 |
| | | | | R | 3200 |

Column 1 represents the numbers produced by the situation described in association with FIG. 2a. Column 2 corresponds to the signals produced from the situation described in association with FIG. 2b. Column 3 represents the numbers stored in response to the situation illustrated in FIG. 2c.

Figure 3:
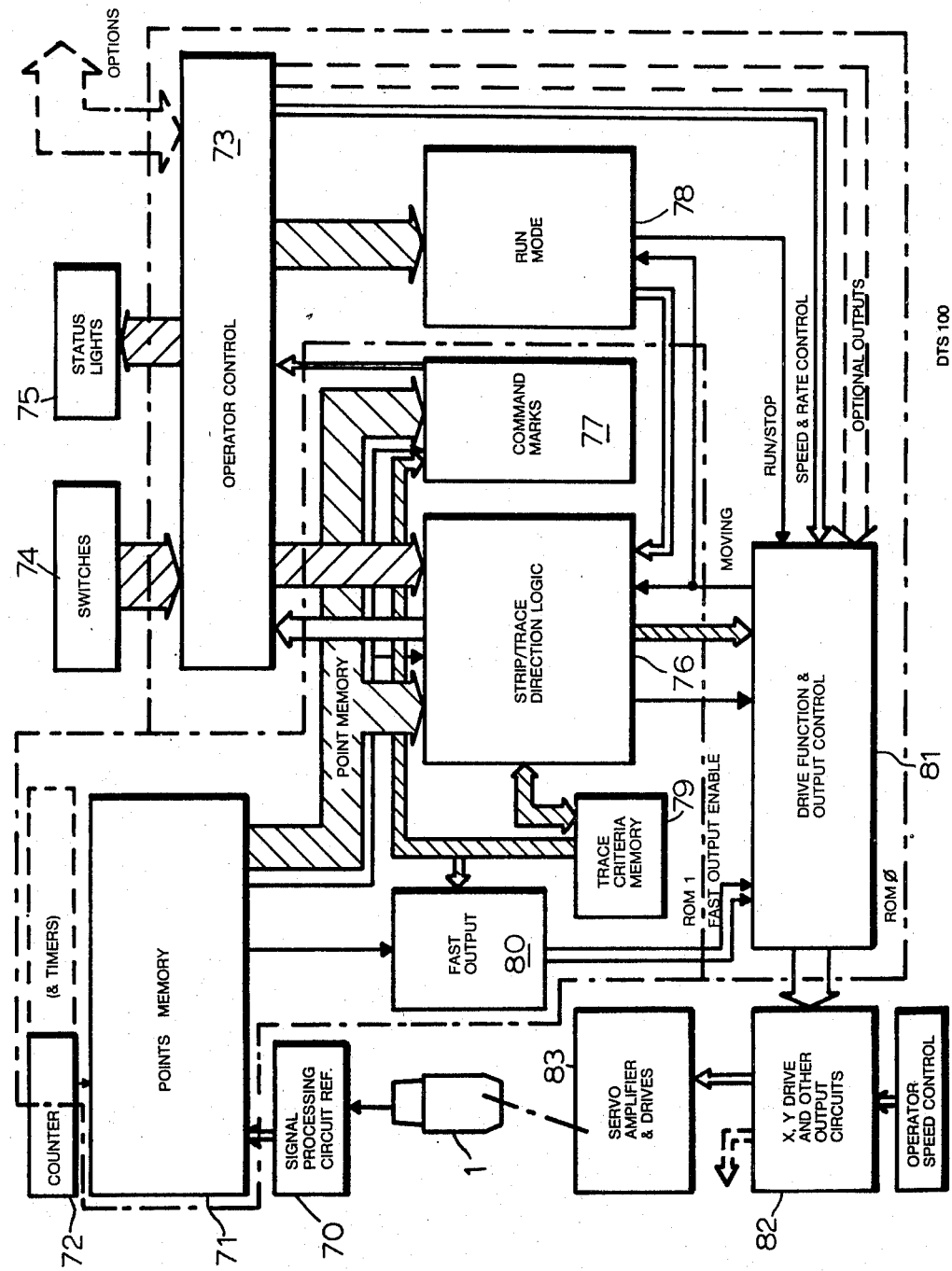
FIG. 3 is a system functional block diagram illustrating the various functions performed by the system components.

Turning now to FIG. 3, there is shown a complete block diagram of a line tracing system including this invention. It will be seen that the tracer 1 provides an output to the signal processing circuitry generally designated 70 which includes various components illustrated in more detail in FIG. 1 including the elements 8, 15, 14 etc. The output from the signal processing circuitry is applied to the point memory which corresponds to the ram 17 in FIG. 1. Also applied to the memory is the output from the counter 72 which represents components 22, 25, 26, 27 and 28 for example, in FIG. 1. The operator control 73, its associated switches and status lights 74 and 75 represent the components generally designated 31 in FIG. 1.

The functions of the microprocessor including eprom 16 and cpu 18 in FIG. 1 are represented functionally in this diagram as the strip trace directional logic 76, the command mark logic 77 and the run mode logic 78. The flow of data and control is shown including the flow of preprogrammed information from the trace criteria memory 79 which is used to select the tracing output information in the fast output function 80 which is in turn used to control the drive function 81 in a manner to be later described. The output from the drive function is applied to the X and Y drives and other output circuits to control the operation of the tracer and it will be seen that the X and Y drive in turn controls the servo amplifier and drives 83 which mechanically control the location of the tracer 1 and at the same time the position and operation of the cutting tools, torches etc. to be pattern controlled by the system.

Figure 4A:
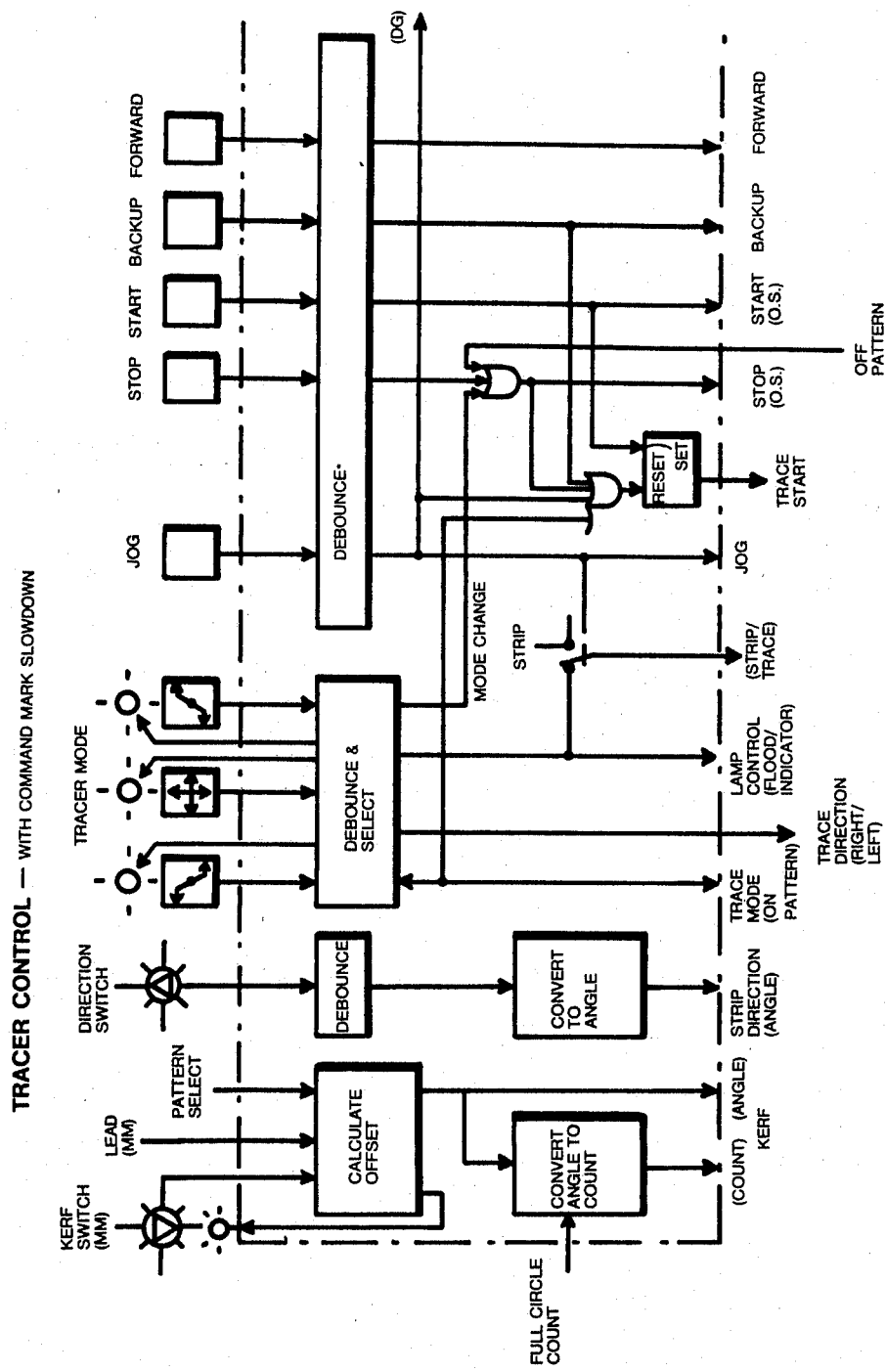
FIGS. 4A and 4B are diagrams of the operator controls and display.
Figure 4B:
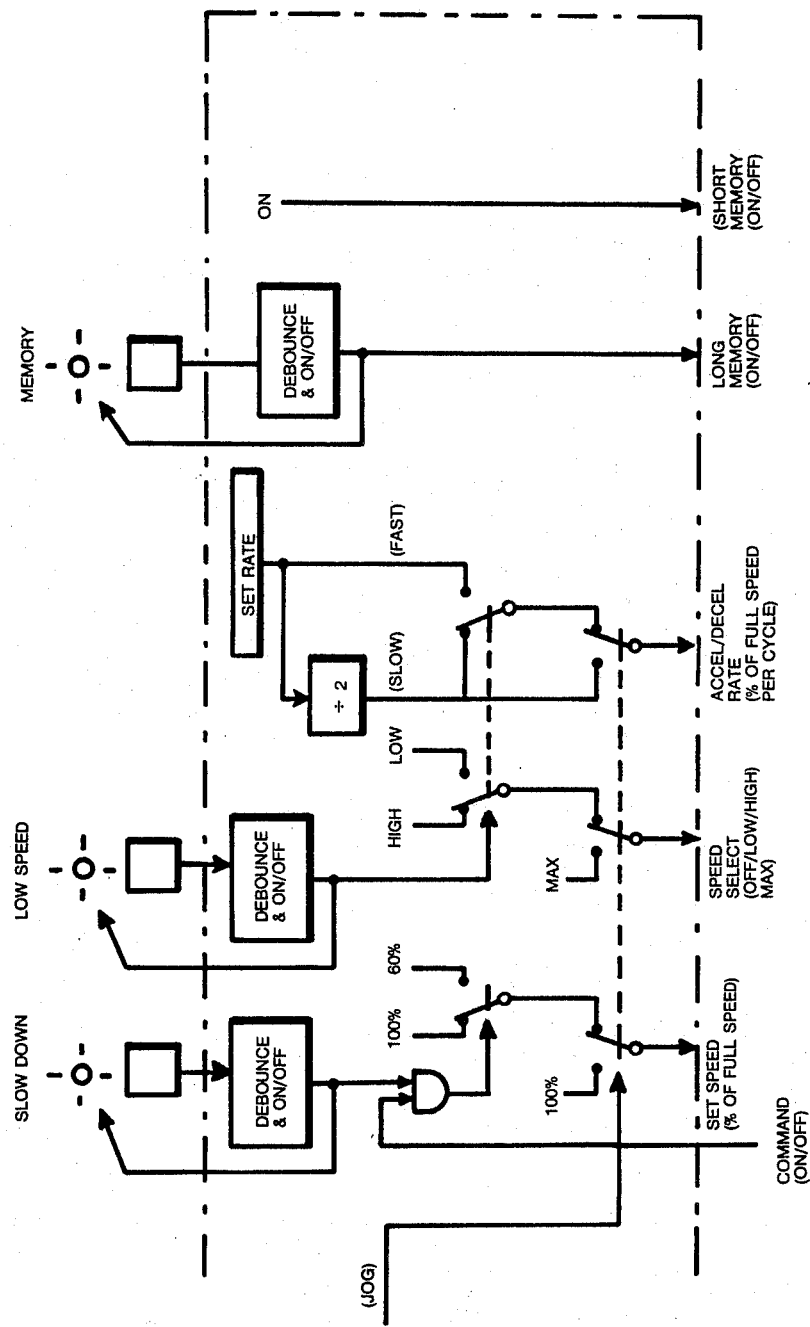

FIGS. 4A and 4B illustrate the various controls available from the operator control and as will be seen all switch outputs must be debounced before being applied to the microprocessor to eliminate false signals. Most of the operator controls simply produce an output which is applied to the system, for example, the direction switch merely sets the direction the tracer is to go under manual control and this direction switch produces a signal which is converted to an angle and used to directly control the servo drive. Other signals such as the kerf switch require a calculation before the information can be used.

As will be appreciated by those skilled in the art and familiar with pattern tracing, kerf is set to correct the width of cut taken by the torch so that the final cut material is the same dimension as the pattern. This allowance can be set in millimeters for example by the kerf switch. However, for this information to be used, it is necessary to also inject information regarding the lead of the tracer, that is, the radius of scan and information regarding the tracer mode i.e. whether it is tracing clockwise or counterclockwise inside or outside the pattern. Also, because of the mode of operation of the system, it is necessary to know the full circle count, that is, the total number of clock pulses occurring between one reference signal and the next. All this information is used, first to calculate the offset angle required to produce the desired kerf and second to produce the desired count by converting the offset angle to a count.

Also available to the operator are various controls to select the tracer mode, that is, whether the pattern is to be traced clockwise or counterclockwise inside or outside the line, the manual control of direction before acquisition of the pattern, the desired speed, a special preset low speed which may be activated by a command mark, the presence or absence of memory to permit the crossing of gaps in the line, backup control to permit reacquisition of the cut in the event the cut becomes discontinuous etc. All the various operator controls will not be described since they vary from application to application and may be provided as desired.

Turning now to FIG. 5, it will be explained in greater detail how the signals derived as described in association with FIG. 1 are processed to produce the desired outputs. This processing is accomplished through the microprocessor which incorporates cpu 18, ram 17 and memory 16 together with the necessary ports and busses. FIG. 5 is a functional block diagram using blocks to describe the function performed and single lines to represent the flow of information and control. As before the tracer 1 is shown to have two outputs, one representing the detection of an edge, that is, a change in reflectance of the area being scanned and the other being a reference signal. The reference signal in fact is a sinusoid and the sinusoid is converted to a square wave by detector 90 which detects the zero crossover point. This square wave is then processed through interrupt logic to produce a signal on the rising edge of the square wave. The signal so produced is applied to the reference processor 92 which produces a count representative of the time between occurrences of reference signals, that is, a store is cleared upon the occurrence of a reference signal, the count is applied from counters 93 and 94. On occurrence of the next reference signal the count is transferred to a point memory 95 together with an identifier indicating that this count represents a full circle count. The full circle count is also transferred to the full circle count store 96 which is updated on each occurrence of a reference.

In a similar manner, the sense signal indicating the edge of a pattern is processed in the edge detector 97 and separated into two signals, one on conductor 98 representing a rising edge and one on conductor 99 representing a falling edge. These are processed in the interrupt logic 100 and applied to store 101 which is receiving the count from counters 93 and 94. This store is cleared with each reference signal and transfers its count into the point memory upon the occurrence of each sensor signal. The count transferred also includes an identifier indicating whether it is rising or falling edge signal.

These signals transferred into the point memory 95 are stored in sequence. The full circle count is divided by 4 to produce a count representative of a plus or minus 45 degree window which together with the last directional signal indicative of the angle of the pattern with reference to the center of scan and the reference point in the scanner is processed in the functional block 102 which functionally may be described as a processor to produce a window which represents an angle plus or minus 45 degrees on each side of the last detected direction. The point counts from the sensor signal process 101 are also applied to processor 102 and the point falling within the window having the proper sense is the point which is utilized to determine the proper direction of drive. It will be noted that it is necessary to know not only the last direction of the pattern but also the sense of the signal to be used for tracing since the operator may select either a rising edge or a falling edge signal. That is, the pattern may be traced either on transition from white to black or a transition from black to white. If a signal is detected of the proper sense within the window, then an enable fast output is produced to indicate that a suitable signal is available. Under these circumstances, the selected count, that is, the count representing the angular direction of the pattern and the kerf angle in the form of an angle in the proper sense is converted to an angle in converter processor 103 and the angular direction so produced applied to the coordinate drive system to suitably energize the coordinate drive motors and cause the tracer to travel in the proper direction.

The selection of the proper point is in part determined by those trace criteria supplied by the operator and as has been previously indicated, this may permit tracing on a rising or falling edge as described. It is also possible, in the event the operator wishes to reverse direction, to select the 45 degree window in the opposite direction simply by applying the window information together with a count representative of one-half circle count added to the last direction count. Also provided by the operator in the tracing criteria is the kerf information previously referred to. This kerf information is added or subtracted from the point information in accordance with whether the kerf is on the inside or outside of the pattern as determined by the operator and the kerf angle is added in the proper sense to the point information before conversion into an angular direction.

The information indicating that the tracer has detected the pattern and is properly following the pattern may also be used to provide an on pattern signal to ensure the machine continues operation only when a pattern is detected. This on pattern signal may only disappear for example after three cycles have failed to detect the presence of a pattern. It may also be arranged not to provide an on pattern signal until three cycles have been completed, thus ensuring that the operator maintains control of the tracer until such time as the pattern has actually been detected and the machine is operating properly.

Figure 6:
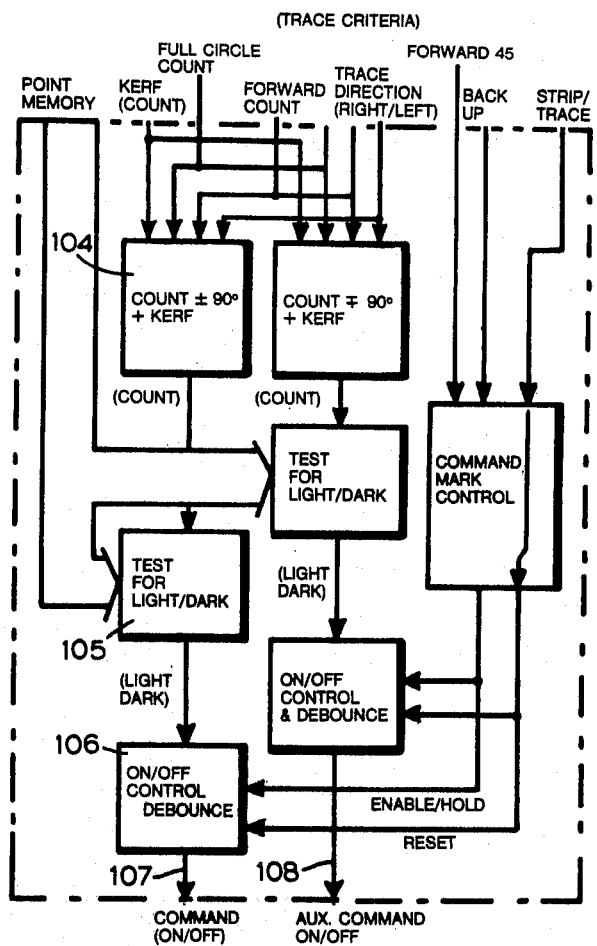
FIG. 6 is a functional flow diagram of the command mark processing.

As will be seen in FIG. 6, provision is also made for detecting the presence of command marks, that is, black areas adjacent the pattern at 90 degrees to the direction of tracing. To this end, as will be seen, the full circle count, the kerf count and the selected sensor signal count are applied to two processes, one of which combines the count indicating direction with plus or minus 90 degrees, that is, one-quarter of the full circle count plus the kerf count and this together with the information from the point memory is processed in processor 105 to indicate whether the pattern at that point is light or dark. This information is available because the point memory indicates in addition to the count whether the transition was light to dark or dark to light. The nearest points to the 90 degree points are tested to determine whether the one before the 90 degree count represents a light to dark transition and the one after the 90 degree count represents a dark to light transition. If this test proves true, then there is a command mark at 90 degrees to the pattern and this information is applied to the on/off command processor 106. After a predetermined number of occurrences of a true signal for example after three occurrences, a command "on" signal is produced providing an output on conductor 107.

In a similar manner, the other side of the pattern is examined by adding minus or plus 90 degrees, testing for light or dark and producing an auxiliary command on conductor 108. When the desired number of true signals have been received, the command and auxiliary command functions may be arranged to remain on until the command or auxiliary command marks have failed to be detected for a number of occurrences for example, three cycles as in the case of the generation of the command or auxiliary command signals.

These command and auxiliary command signals may be used for various purposes. For example, the operator has control of the normal operating speed of the machine, he also has control of a slower speed which may be used to control the coordinate drive when the command mark indicates this is desirable. The auxiliary command mark may be used to produce other controls depending on the nature of machine tool associated with the tracer.

Figure 7:
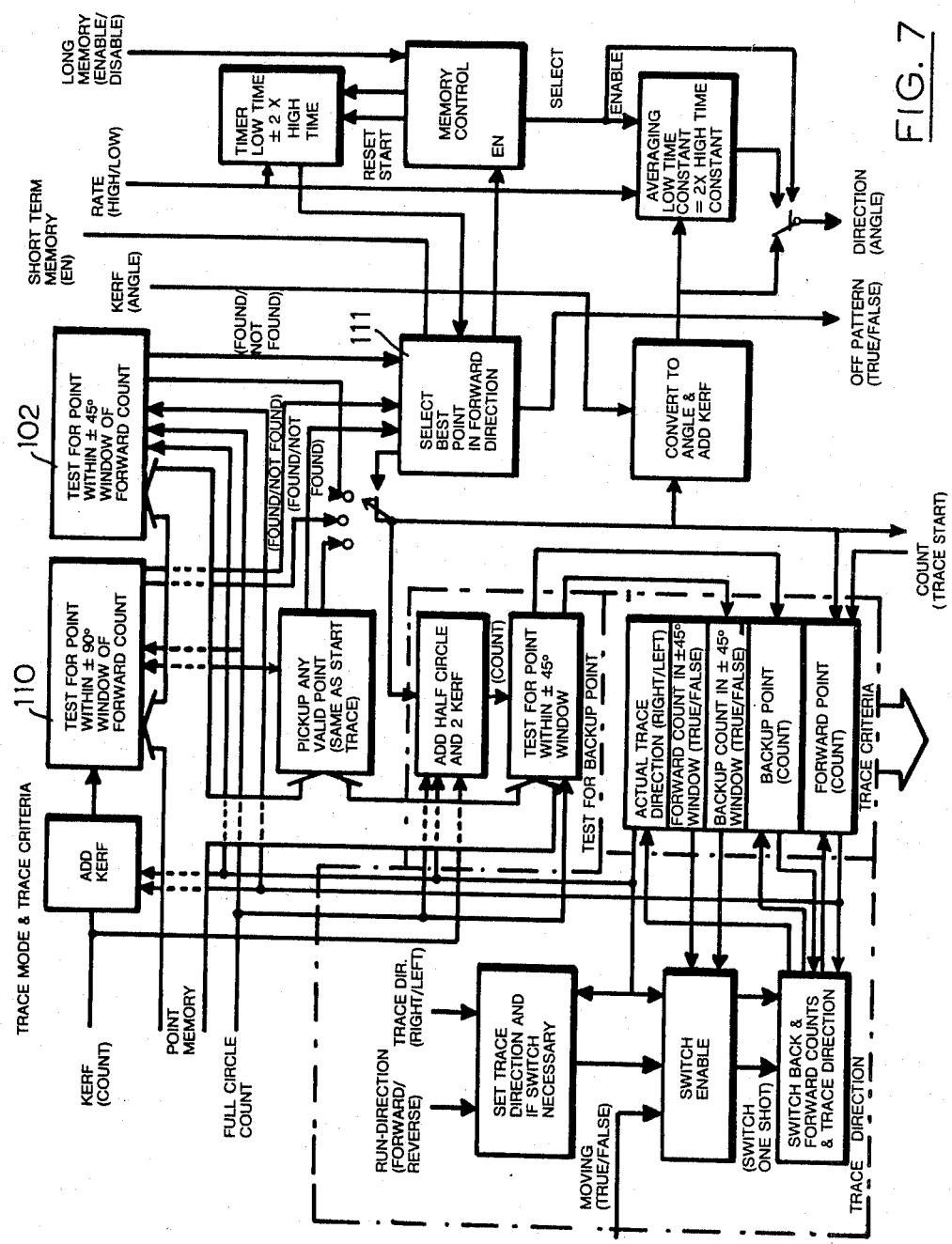
FIG. 7 is a functional flow diagram of the memory function.

As has been previously indicated, the off pattern signal may cause the machine to stop when the tracer fails to detect a pattern within the normal plus or minus 45 degree window. As will be seen in FIG. 7, other criteria may be used when the tracer fails to find a suitable point within the plus or minus 45 degree window. The point memory information may also be applied to a processor 110 which tests for a point within plus or minus 90 degrees of the forward count as well as the processor 102 previously referred to. If processor 102 fails to find a point and the point is found within plus or minus 90 degrees, this point may be used as steering information and processor 111 will select the best point in the forward direction. Also provided in that portion of the system illustrated in FIG. 7 is a memory also under the control of the operator which can store the direction information for a period of time determined by the operator. The absence of a signal on the next scan after detecting a suitable signal may then either result in the machine stopping or continuing, if the memory has been activated, to enable the machine to continue in its previous direction until such time the pattern is once more detected. The duration of the memory either short or long term is determined by the operator controls. This determination as to whether the direction information is derived directly from the latest point information or from the average information stored in the memory is determined by the operator control.

Figure 8:
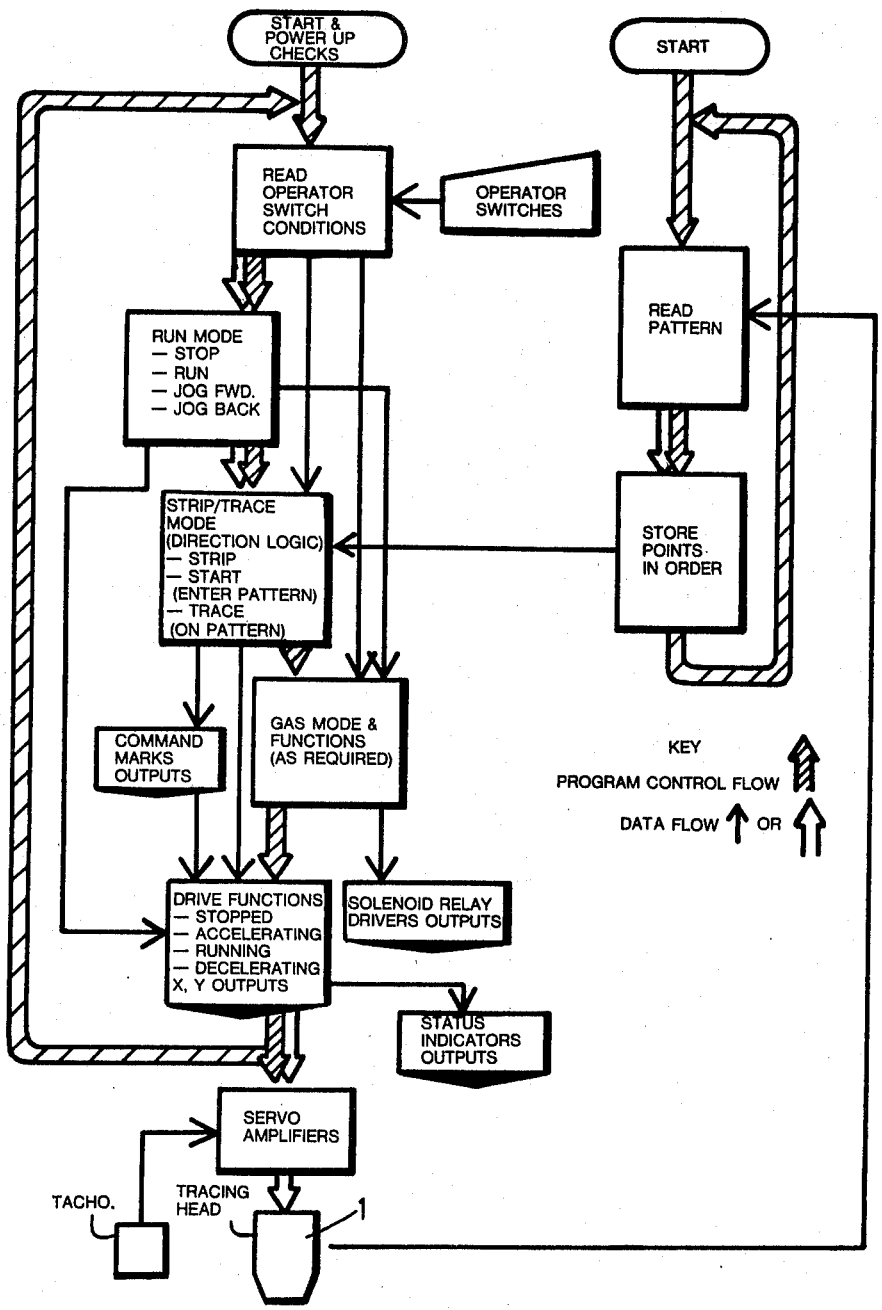
FIG. 8 is a flow diagram for a complete tracing system.

FIG. 8 is a flow diagram to illustrate the general operation of the system. As will be seen, the information from the tracing head 1 flows to a pattern reading process which produces data stored as a series of points stored in order and indicative of the nature of the point, i.e. whether it is a reference point, a rising edge or a trace falling edge. The data from the point store is applied to the direction logic in a separate loop. The operator switches indicate the mode to be pursued. Startup and power up checks provide an indication and control of the read function which reads the operator switch condition and provides data and control to the mode function which determines whether the machine shall stop, run, jog forward or jog back. The output from the run mode also controls the strip trace mode function determination of whether the machine is in a strip or trace mode of course is provided from the operator switches through the operator switch functions and applied to the strip trace mode. The strip trace mode function then derives the direction information either from the operator control in the strip mode or from the points information by processing the point information. The point information is also data for the command mark function which produces an output if command marks are present. Also from the operator switch read function are various controls such as the gas control which also may be under control of the strip trace mode so that the gas may be discontinued in the event of loss of pattern. The start signal may also be used for preheat control of the gas, the start signal control comes from the start and power up operation by the operator. The data required for the servo amplifiers is provided to the drive functions from the run mode and trace mode functions, also from the command marks. All three sources of information are required to indicate whether the drive should be stopped, accelerating, running and if running, at what X and Y coordinate values. Outputs from the gas mode and functions provide solenoid relay and other signals necessary to the system. Outputs from the drive functions applied to the servo amplifiers control the position of the tracing head and associated machine tool. The tracing head is part of a closed loop system including a tachometer which provides a feedback information to the servo amplifiers to stabilize the motion of the tracing head.

While the system has been described from a functional point of view, it will be understood that the actual devices used to perform the necessary calculations, storing and processing may all be contained within a single microprocessor programmed in a manner well known to those skilled in the art. It is also evident that the microprocessor may have a capacity to store other information and programs useful in addition to those particularly described. Such additional programs may be under the control of the command marks for example or the gas mode and functions, the operator switches or other data derived from the pattern or from the current status of the machine. The system has the particular advantage of reducing all information to digital information which provides for a commonality of a characteristic which enables all the information to be dealt with in a similar manner within a single processor.

The embodiments of the invention in which an exclusive property or privilege is claimed are defined as follows:

1. A circular scanning photoelectric pattern tracer including a scanning head having scanning means to repetitively scan a circular path about a centre of scan including a pattern distinguished by a change in optical reflectance, and produce signals of a first kind whenever an edge of said pattern is crossed by said scan and signals of a second kind whenever said scan passes a reference point within said scanning head, means to derive numerical values representative of the time between occurrence of said signal of said second kind and the occurrence of said signals of said first kind, means to store said numerical values in order of their occurrence and to distinguish by means of first and second symbols numerical values representing signals of said first kind in accordance with whether the scan is entering or leaving the pattern, means to derive a first count representative of the time duration of one complete scan, means to derive a second count representative of the angular offset required to produce the desired kerf, means to derive a third count representative of the predicted limits of angular direction in which the pattern will appear, means to select from said numerical values those occurring during said third count and bearing either first or second symbols as selected, means to combine said selective numerical value with said second count to produce a fourth count representative of the required direction of travel of the said centre of scan to maintain said centre of scan the desired offset distance from said pattern, means to convert said fourth count to a pair of coordinate values representative of the sine and cosine of the angle contained between the centre of scan, the reference point and the point on the scan represented by said fourth count, means to combine each of said coordinate values with a number representative of the desired tangential tracing velocity and produce speed signals representative of the coordinate velocities necessary to cause said tracer to trace said pattern and means to apply said speed signal to a pair of coordinate drive motors to cause said tracer to move with the said coordinate velocities.

2. A circular scanning photoelectric pattern tracer as claimed in claim 1 wherein said pattern consists of a black line on a white surface and includes in addition black command marks adjacent said pattern, means to derive a fifth count representative of the limits of angular direction in which said command marks may be detected with respect to the centre of scan, means to select from said numerical values that one immediately preceding said fourth count and that one immediately succeeding said fourth count in time and means producing a command detect signal if the immediately preceding signal bears a first symbol and the immediately succeeding signal bears a second symbol, means to commence a command signal upon occurrence of a predetermined number of command mark detect signals and to terminate said command signal upon the absence of a predetermined number of command detected signals.

3. A circular scanning photoelectric pattern tracer including a scanning head having scanning means to repetitively scan a circular path intersecting a pattern to produce signals of a first kind whenever an edge of said pattern is crossed by said scan and a signal of a second kind whenever said scan passes a reference point within said scanning head, means to derive digital numerical values representative of the time between occurrence of said signal of a second kind and the occurrence of said signals of said first kind, means to process said numerical values together with digital numerical values representing operator input information to produce digital numerical values representative of the necessary coordinate velocities to cause said pattern tracer to proceed along the pattern in a direction and velocity determined by at least some of said operator input information and means to utilize said digital velocity information to control coordinate drive motors connected to said scanner to cause said scanner to move along said pattern in the desired manner.

4. A circular scanning photoelectric pattern tracer as claimed in claim 1 including means to store said fourth count and utilize said stored fourth count in the absence of signals of said first kind.

5. A circular scanning photoelectric pattern tracer as claimed in claim 1 including in addition means to produce a fifth count corresponding to said third count but having greater predicted limits of angular direction in which the pattern may appear and means to utilize said fifth count to select from said numerical values those occurring during said fifth count bearing either first or second symbols, as selected, when no such numerical values occur during said third count.

6. A circular scanning photoelectric pattern tracer as claimed in claim 2 wherein said desired tangential tracing velocity is varied upon the occurrence of said command signal.

7. A circular scanning photoelectric pattern tracer as claimed in claim 1 or 5 wherein said desired tangential tracing velocity is reduced to zero in the absence of any numerical value occurring during said third or fifth count bearing either first or second symbols, as selected.

* * * * *